United States Patent [19]

Bauer

[11] 4,331,514
[45] May 25, 1982

[54] STILL

[76] Inventor: Martin G. Bauer, Rte. 1, Box 15, Bismarck, N. Dak. 58501

[21] Appl. No.: 177,163

[22] Filed: Aug. 12, 1980

[51] Int. Cl.³ .............................................. B01D 3/02
[52] U.S. Cl. ................................ 202/181; 202/185 B; 202/185 D; 202/196; 202/234
[58] Field of Search ............... 277/207 A; 203/10, 11, 203/DIG. 2, DIG. 11, DIG. 24; 137/426; 202/83, 163, 166, 167, 176, 177, 181, 182, 185 R, 185 B, 185 D, 189, 196, 233–235, 237

[56] References Cited

U.S. PATENT DOCUMENTS

| | | | |
|---|---|---|---|
| 2,767,732 | 10/1956 | Hodgson et al. | 137/426 |
| 3,667,785 | 6/1972 | Kapeker | 277/207 A |
| 4,139,418 | 2/1979 | Sech . | |

*Primary Examiner*—Frank Sever
*Attorney, Agent, or Firm*—Dowell & Dowell

[57] ABSTRACT

A still for the distillation of water or other liquids, the still having a boiling chamber with a heater, a vapor condenser chamber, and a vapor separator chamber all supported by a frame having a catch basin below the chambers and a distilled liquid sump below the catch basin into which the condenser discharges. The chambers telescopically plug together in position on the frame and are easily separated and knocked-down for cleaning without requiring tools. The chambers are tubes having their ends removably plugged, and one of the plugs in the boiling chamber carries the heater with it, the heater coils supporting a convection sleeve which is easily separated therefrom for cleaning. The water level in the boiling chamber is controlled by connection with a separate tank having a float valve setting its own level, and the unit has automatic electrical shut-off switches operative when the sump is full or in case of overheating.

8 Claims, 1 Drawing Figure

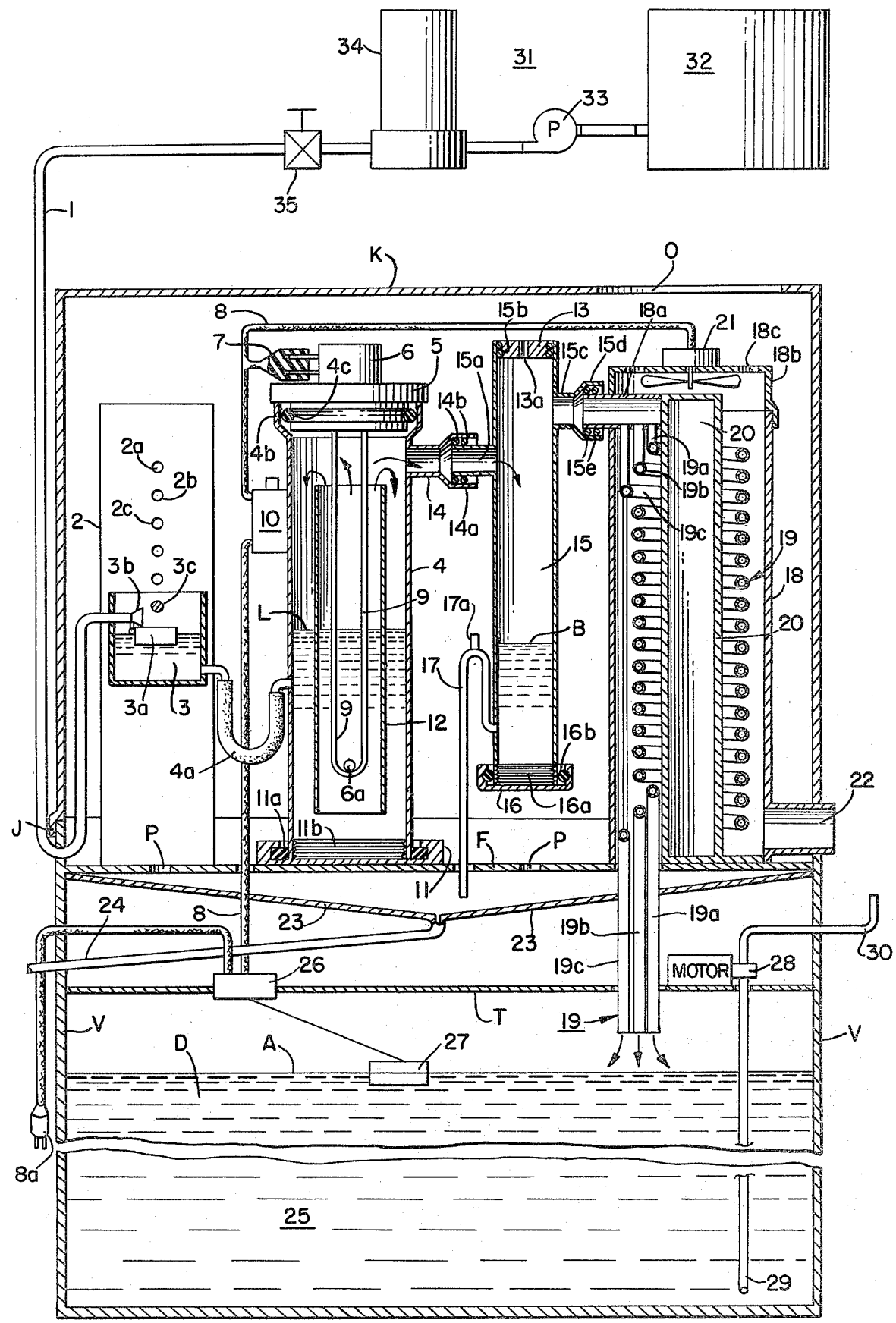

STILL

BACKGROUND & PRIOR ART

In many regions of the world, the water available for drinking and washing, or for various industrial purposes, has a high mineral content, which not only makes the water unpleasant to drink, but reduces its usefulness in washing, cooking, and industrial processes which require more pure water. This is particularly true of wellwater in rural areas. There are many different types of fresh water stills especially designed to purify water, often in the small quantities used in a domestic installation, but most of the stills available for this purpose are very difficult to clean. Particularly in areas where the mineral content in the wellwater is highest, small distillation units build up deposits of minerals causing caking in the apparatus at a high rate. Unless these deposits are removed periodically, they first reduce the efficiency of the still, and eventually render it entirely inoperative. The present disclosure provides a still having multiple different chambers connected in series with each other and including a boiling chamber, a steam separator chamber, and a condenser chamber.

U.S. Pat. No. 3,080,302 to Rogers et al shows a still having three chambers of this type connected in series with each other and comprising separate vessels. U.S. Pat. No. 1,466,535 to Kyrides and provides means for maintaining a desired liquid level within the steam separator. U.S. Pat. No. 3,138,546 to Muller also provides a liquid height tube arrangement for controlling the height of liquid in a separator unit which comprises a chamber separate from the boiling chamber of the unit.

U.S. Pat. Nos. 1,252,962 to Soderlund et al and 3,975,241 to Smith show float valve arrangements for maintaining a predetermined liquid height, the former patent showing it in a boiling chamber of a distillation unit. U.S. Pat. Nos. 3,838,016 to Powers, 3,935,077 to Dennison, 4,052,267 to McFee, and 3,350,279 to Tochin all showed distillation systems having a fan for forcing cooling air through a condensing chamber.

U.S. Pat. Nos. 4,139,418 to Sech and 4,052,267 to McFee both show sleeves extending upwardly around a heater unit which heats the liquid in a boiling chamber, these tubes assisting the convection pattern in the chamber to provide more rapid generation of steam.

The above features all bear similarity to features of the present still, but do not provide a still construction which is readily demountable for easy cleaning.

THE INVENTION

The distillation unit according to the present invention comprises a frame having a sump in the bottom thereof for receiving distilled water, and having a catch basin above the sump for catching any undistilled drippage from the chambers and disposing of it through a drainpipe. The frame has a platform which supports a boiling chamber and a condenser chamber, which chambers are connected together by a steam water separator chamber, these units all being covered by a heat-retaining cover which fits over the frame. The boiling chamber, the separator chamber, and the condenser chamber are all quickly and easily disassemblable from each other without tools so that they can be conveniently cleaned and reassembled with whatever frequency is made necessary by the degree of contamination of the water being distilled. These units telescopically slide together and their joints are sealed by O-rings. An electrical heating element is suspended inside the boiling chamber and it has a sleeve which surrounds the heating element and extends upwardly into the boiling chamber for controlling the convection pattern of the water being boiled. The sleeve is suspended on the heating coils themselves which take the form of Calrod type heaters, whereby the sleeve is easily separable from the heating coils after the heating unit has been withdrawn from the boiling chamber. The liquid level in the boiling chamber is controlled by a novel tank arrangement containing a float valve, the entire tank being vertically adjustable as to height with respect to the boiling chamber so as to maintain the level of water in the boiling chamber at whatever level may be desired. The still is not limited to the distillation of water. The separator unit has means for controlling the height of the separated water in it, and when the separator chamber has been disassembled from the condenser chamber, the condensing coil assembly is easily removed from the chamber so that all parts of the unit are easily cleanable. A circuit including automatic switches shuts down the still in the event that it should overheat, and also shuts down the still when the level of distilled water approaches the top of the sump.

OBJECTS AND ADVANTAGES

It is the principle object of this invention to provide a still in which the various chambers and parts which are subject to build up of chemical deposits are all easily removable and dismountable for cleaning, without requiring the use of tools. The various chambers are supported and joined together by an arrangement of threaded joints and telescoping tubular joints which are sealed by O-rings.

It is another important object of the invention to provide an improved system for maintaining the height of the liquid in the boiling chamber without using floats and valves which are located within the boiling chamber itself, the improved system comprising a separate float valve tank which is connected to the boiling chamber by a flexible tube. The float valve tank is adjustable in height, and the liquid level in the boiling chamber always is the same as the float valve level in the separate tank.

Another object of the invention is to provide a still having a frame on which the demountable chambers and component parts are supported, and the frame including a drip pan and drain located beneath the chambers so that when the system is being disassembled for cleaning, any water inadvertently released from the chambers is caught in the drip pan and deflected away from the distilled water sump located therebelow.

Another object of the invention is to provide a steam separator chamber having a small vent hole located in the top thereof which permits the escape of non-condensing gases, including air which may be released from the water while it is being boiled. Such gases take with them odors which tend to cause a foul taste in the distilled water. Such gases include not only air, but also sulfurous gases which can redesolve in the distilled water while it is being condensed if the only route for escape of these gases is through the condensing coils, rather than through the small vent in the top of the separator chamber. The vent is made small enough so that a negligible amount of steam escapes therethrough.

Other objects and advantages of the invention will become apparent during the following discussion of the drawing.

THE DRAWING

The drawing is a diagram, partly in cross section, showing a preferred embodiment of the still made according the present invention.

PREFERRED EMBODIMENT

Referring now to the FIGURE of the drawing, the still shown therein provides improvements over the prior art, especially with respect to ease of cleaning and maintenance. The still as shown in the drawing is currently being used for removing impurities from wellwater and delivering substantially-pure distilled water. In many areas of the country, especially rural areas, the water is strongly contaminated with minerals of a type which cake the distillation equipment and will put it out of operation rather quickly unless such minerals can be easily removable from the various parts of the still.

The still shown in the drawing comprises a frame F which has vertical members V, the lower portion of which comprises a reservoir 25 for the distilled water as will be hereinafter more fully explained. The frame has a cover K having an opening O for a purpose hereinafter to be explained, the cover K extending down and lapping the frame at J and being supported thereon. The cover is not really an essential part of the equipment and can be omitted if desired.

A water inlet duct 1 extends into the still through the frame and terminates in a float valve assembly which is supported upon a bracket 2 inside of a float valve tank 3, the float being labelled 3a and the valve being labelled 3b. The tank 3 has a pin 3c extending rearwardly from it, the pin being mountable in any one of a series of vertically spaced holes 2a, 2b, 2c, etc. in the mounting bracket 2. The float valve 3a and 3b determines the level of the water inside the tank 3, and the vertical height of the tank as supported on the pin 3c determines the height of the water within the boiling chamber 4, the boiling chamber being coupled with the float level tank 3 by a length of flexible hose 4a so as to cause the water level L in the boiling chamber to follow the water level in the tank 3 at all times.

The boiling chamber 4 comprises a cylindrical tube which is flared at its upper end as at 4b to receive an upper closure plug 5 which fits into the boiling chamber and is sealed thereto by an O-ring 4c which is retained in a groove in the periphery of the plug 5. The plug 5 supports an electrical receptacle 6 at its upper end which is connected with an electrical connector 7 comprising a part of the electrical wiring 8 which is supplied with electrical current through an electrical connector 8a. The upper plug 5 of the boiling chamber 4 also supports a downwardly extending Calrod type heating coil 9 which is immersed in the water in the boiling chamber 4. The temperature of the boiling chamber is monitored by an overheat thermostat 10 comprising an electric circuit breaker for de-energizing the heater element 9 in the event that the boiling chamber becomes over-heated, for instance as might occur if the water level L in the chamber 4 were not maintained properly for any reason.

The lower end of the boiling chamber 4 fits in a lower plug member 11 which is supported on the frame F and is secured thereto in any suitable fashion. This lower plug carries an O-ring 11a which seals the chamber when it is in place on the plug 11 and lends it a degree of vertical support. In order to insure non-tilting support, the plug 11 has a screw threaded upright portion 11b which screws into the bottom of the chamber and holds it in place. Inside the chamber and surrounding the heating element 9 is a sleeve 12 which is open at its lower end. The sleeve 12 confines the water which enters through its open bottom and maintains it intimately associated with the heating element 9 so as to be quickly boiled by the heating element. Steam formed by the boiling passes over the top of the sleeve 12, and some of it will condense and run back down into the water, although most of it will pass in the rightward direction out of the chamber 4 through a duct 14 having an enlarged end 14a which telescopically receives a mating duct 15a of a steam separator chamber 15. Suitable O-rings 14b seal the duct 15a with respect to the duct 14a.

The steam separator chamber 15 is closed at its top by a plug 13 having a vent hole 13a, the plug being frictionally held in the upper end of the tube forming the separator chamber 15 by O-rings 15b. The lower end of the separator chamber 15 is internally threaded and is closed by a screw plug 16 having screw threads 16a which engaged internal threads of the separator chamber 15 and hold the plug 16 in place thereon. In addition, an O-ring 16b seals the assembly against leakage. The steam passing from the boiling chamber 4 into the separator chamber 15 contains water droplets, and some chemical foam, and these droplets fall into the bottom of the chamber and accumulate to a level B which is maintained by an inverted U-tube 17 having a vent 17a in its upper end so as to prevent siphoning of the contents. The U-tube 17 maintains the level B substantially constant.

The separated steam in the separator chamber 15 then passes outwardly through the duct 15c which has an enlargement 15d at its outer end containing O-rings 15e which seal against a duct 18a which is supported in the side of the condenser chamber 18 and extends laterally therefrom. The inner end of the duct 18a inside the chamber 18 connects with three interwound helical coils 19a, 19b and 19c which together comprise the condenser coils 19 of the still, the lower ends of these coils discharging into the distilled water sump 25.

The upper end 18b of the condenser chamber 18 is removable so as to permit removal of the duct 18a and the condenser coil coils attach thereto. In addition, a core tube 20 extends down through the center of the coils and serves to cause greater airflow in the vicinity of the coils when the fan 21 is energized via the electrical wiring 8. The upper portion 18b of the condenser chamber 18 has openings 18c so as to permit air circulation by the fan 21 through the chamber 18 and duct 22, and through the openings 18c in the cap portion 18b of the condenser chamber 18. The lower end of the condenser chamber is fixed to the frame and stands upright thereon, it being unnecessary to remove this chamber for cleaning, since it is not exposed to chemical-containing water. The cover K has an opening O above the fan so as to permit the circulation of air through the chamber 18. The air can be driven in either an upward or a downward direction by the fan, whichever is more desirable. Upward flow of the air tends to be more efficient since it is aided by convection and since it produces counterflow of the cool air on the coils 19. Such counterflow brings the coldest air into contact with the coolest end of the coils near their bottoms and as the air is warmed and travels upwardly it comes into contact with progressively hotter portions of the coils 19, whereby as the air is warmed it is still able to exchange heat with coils of increasing temperature. This is a well-known phenomenon.

Beneath the top horizontal platform of the frame F, which has a series of perforations P therethrough, there is a catch basin 23 having a drainpipe 24 extending leftwardly from its center and discharging outwardly of the frame into some suitable receptacle or drainpipe which forms no part of the present invention. This catch basin permits any drippage to be removed from the still without contaminating the water in the distilled water sump 25 located below it. Moreover, when the boiling chamber 4 and the separator chamber 15 are opened for removal and cleaning, there will undoubtedly be a certain amount of water spilled onto the frame F and thence into the catch basin.

The sump 25 has a top portion T through which the lower ends of the condenser tubes 19 pass to discharge into the distilled water D in the reservoir 25. The top portion T also supports an electrical switch 26 which is operated by a float 27 in such a way that when the level A of the distilled water D reaches a satisfactory height, the float 27 actuates the switch 26 and opens the electric circuit of the wiring 8 to the heating element 9 and the fan 21. In addition, the top surface T of the reservoir 25 supports a motor-driven pump 28 which can be manually or automatically operated to draw water through a pipe 29 extending downwardly into the reservoir 25 and deliver the water through a pipe 30, for instance to kitchen or bathroom plumbing fixtures (not shown).

The water which enters the still through the duct 1 may be drawn from a pressure system, such as city water pressure, or may be drawn from a domestic pumping system 31 serving as the source of water supply, and including for instance a pressure dome 34 which stores a head of water from a reservoir 32 supplied through a pump 33, the water then being selectively supplied to the inlet duct 1 of the still through a manual shutoff valve 35. The supply system 31, however, forms no part of the inventive still which is the subject of this disclosure.

In operation, the still is supplied with water to be distilled through the duct 1, and the float valve 3b maintains the water at a fixed level within the tank 3. Makeup water is supplied to the boiling chamber 4 through the flexible tube 4a, and the level L of the water in the boiling chamber is thereby maintained the same as the level of water in the tank 3 whose height is maintained by the float valve. If it is desired to change the water level in the boiling chamber 4, this can be done by moving the entire tank 3 up or down on the bracket 2 by inserting the pin 3c which is fixed to the tank 3 into a selected one of the holes 2a, 2b, 2c etc. in the bracket.

The heater element 9 continuously heats the water inside the sleeve 12 causing it to boil vigorously so that a head of steam is built up in the top of the boiling chamber 4, the steam departing through the outlet duct 14 and into the separator chamber 15 through its inlet duct 15a. In some locations, where the water is particularly contaminated with chemicals, as at the inventor's home, a considerable amount of foam builds up in the upper portion of the boiling chamber 4 and some of it passes through the ducts 14 and 15a and gets into the separator chamber 15. This foam, together with unvaporized water droplets and a certain amount of air and other noncondensing gases will be separated from the steam in the separator chamber 15, the noncondensing gases passing upwardly through the vent 13a and out of the top of the chamber 15, and the foam and water will tend to settle to the level B where the water is drained off through the U-tube 17 and into the catch basin 23. The remaining uncondensed steam passes through the duct 15c and the duct 18a and into the condensing coil tubes 19a, 19b and 19c. These tubes achieve condensation of the steam by heat interchange with air being pumped through the condenser chamber 18 and around the core tube 20, the fresh water condensate falling from the bottom of the condenser tubes 19 into the fresh water sump 25. The function of the cover K is to keep down air circulation in the vicinity of the boiling chamber 4 and the separator chamber 15 so as to reduce the amount of undesirable condensation occurring inside of those chambers.

The system can be cleaned by removing the cover K, removing the cap 18b from the condenser chamber 18 and then withdrawing the plug 5 from the top of the boiling chamber, thereby removing the heater element 9 and the sleeve 12 along with the plug 5. The flexible hose 4a is then removed, and the boiling chamber itself 4 unscrewed from the threaded portion 11b of the plug 11. This can be done after removal of the separator chamber 15. Although the ducts 15a and 15c are shown 180° apart as they extend laterally from the side of the separator chamber, these ducts can be angled so that they are separated only by an acute angle, thereby making it easier to withdraw the chamber 15 from the chambers 18 and 4 for cleaning purposes. Once the chamber 15 is removed, the boiling chamber 4 can be unscrewed and removed for cleaning. It is not believed that ordinarily the condensing coils or the chamber 18 will need cleaning. However, the coils are easily lifted from the chamber for this purpose after the cap 18b is removed. The chamber 15, being light in weight, can hang from its ducts 15a and 15c if desired, although it can also be supported on the frame F if the chamber 15 is further elongated and the bottom plug 16 is secured to the frame F.

Once the parts have been removed from the frame, it will be easy to clean them individually. The sleeve 12 is simply hung on the heater 9 by a pin 6a which extends through the sleeve and the heater coil, and which when removed permits the sleeve 12 to drop down off of the heater for cleaning.

Although the drawing shows a preferred embodiment, it is to be understood that changes may be made within the scope of the following claims. For instance, the heating element 9 can be supported in the lower plug 11 if desired, the direction of airflow in the condensing chamber 18 can be in either direction, and the various parts can be supported on the frame member differently from the manner of support shown in the present drawing. This invention is therefore not to be limited to the illustrated embodiment.

I claim:

1. In a still for removing impurities from water, the still being of the type having a supporting frame, water heater means and a boiling chamber and a separator chamber which tend to be fouled by said impurities, a condenser chamber, and water inlet means operative to control the level of water in the boiling chamber, improved structure to facilitate knock-down of the still for cleaning, comprising:

a condenser chamber tube fixed upright to the frame and having an inlet;

a boiling chamber tube having a water entrance, an outlet, and a removable closure plug at each end, the boiling chamber tube being detachably supported upright by the frame, and the water heater means being carried by one of said plugs;

a separator chamber tube having a removable closure plug at each end and having laterally extending duct means, the duct means being telescopically receivable in the boiling chamber outlet and in the condenser chamber inlet and being disposed to support the separator chamber in upright position;

the boiling chamber tube and the separator chamber tube and the closure plugs and water heater means being separable from each other to facilitate cleaning; and the water inlet means comprising a float valve tank located outside of and adjacent to the boiling chamber tube, a float valve in the tank coupled to admit water from a pressure source into said tank and to maintain it at a fixed level in the tank, flexible hose means coupling the tank to the boiling chamber water entrance, and adjustable height means carried by the frame and operative to support the tank relative to the boiling chamber at one of a plurality of selectable elevations to maintain a selected level of water in the boiling chamber.

2. The still as claimed in claim 1, wherein the boiling chamber heater means comprises an electric heater coil attached to the plug closing one end of the boiling chamber tube and extending thereinto; and a sleeve surrounding the heater coil and supported thereon coaxially within the boiling chamber, the sleeve extending from the lower end of the heater coil at least to the top of the water level in the boiling chamber, whereby to improve convection circulation of boiling water in the chamber.

3. The still as claimed in claim 2, wherein the sleeve is suspended from the heater coil by a transverse pin transfixing the sleeve and the coil.

4. The still as claimed in claim 1, including catch basin and drain means supported in the frame below said chambers to catch any leakage; and means entering the separator chamber partway up its side wall and operative to establish a level for separated water in the separator chamber and to drain water into the catch basin when the water in the separator chamber exceeds that level.

5. The still as claimed in claim 1, wherein the plug closing the upper end of the separator chamber has a small vent hole therethrough to vent non-condensing gases from the chamber to the atmosphere.

6. The still as claimed in claim 1, wherein the duct from the separator chamber enters into the condenser chamber near its upper end; coiled condenser tube means coupled to the duct entering the condenser chamber and coiling downwardly inside the chamber; and a distilled water sump in the frame below the catch basin, the tube means terminating at and discharging into the sump.

7. The still as claimed in claim 6, wherein the condenser chamber surrounds the tube means; an electric fan in the condenser chamber directed to blow air axially therealong, and air inlet and outlet openings respectively spaced apart axially of the chamber.

8. The still as claimed in claim 7, including an electrical float switch in the sump connected in circuit with the heater means and the electric fan and operative to turn "off" the heater means and the fan whenever the distilled water in the sump reaches a predetermined level.

* * * * *